Nov. 11, 1952  D. M. CLARK ET AL  2,617,408
VALVE AND SYSTEM FOR THE PROTECTION OF AIRCRAFT OCCUPANTS
Filed Feb. 26, 1947  3 Sheets-Sheet 2
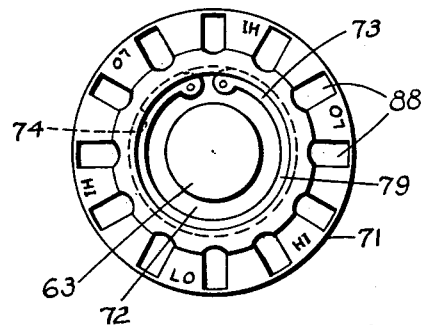
Fig 6
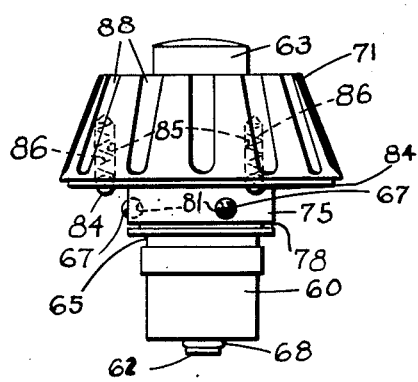
Fig 5
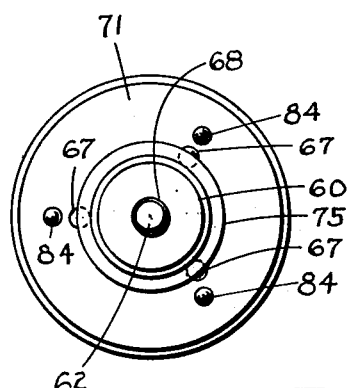
Fig 7
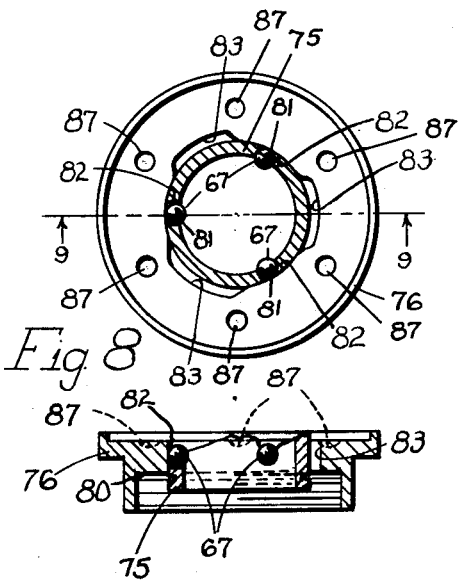
Fig 8
Fig 9
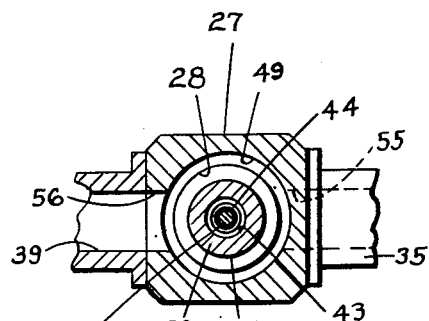
Fig 4
INVENTORS:
DAVID M. CLARK
HENRY W. WILDER
EARL H. WOOD
G. A. HALLENBECK
BY Charles A Williams
ATTORNEY Nov. 11, 1952 D. M. CLARK ET AL 2,617,408
VALVE AND SYSTEM FOR THE PROTECTION OF AIRCRAFT OCCUPANTS
Filed Feb. 26, 1947 3 Sheets-Sheet 3

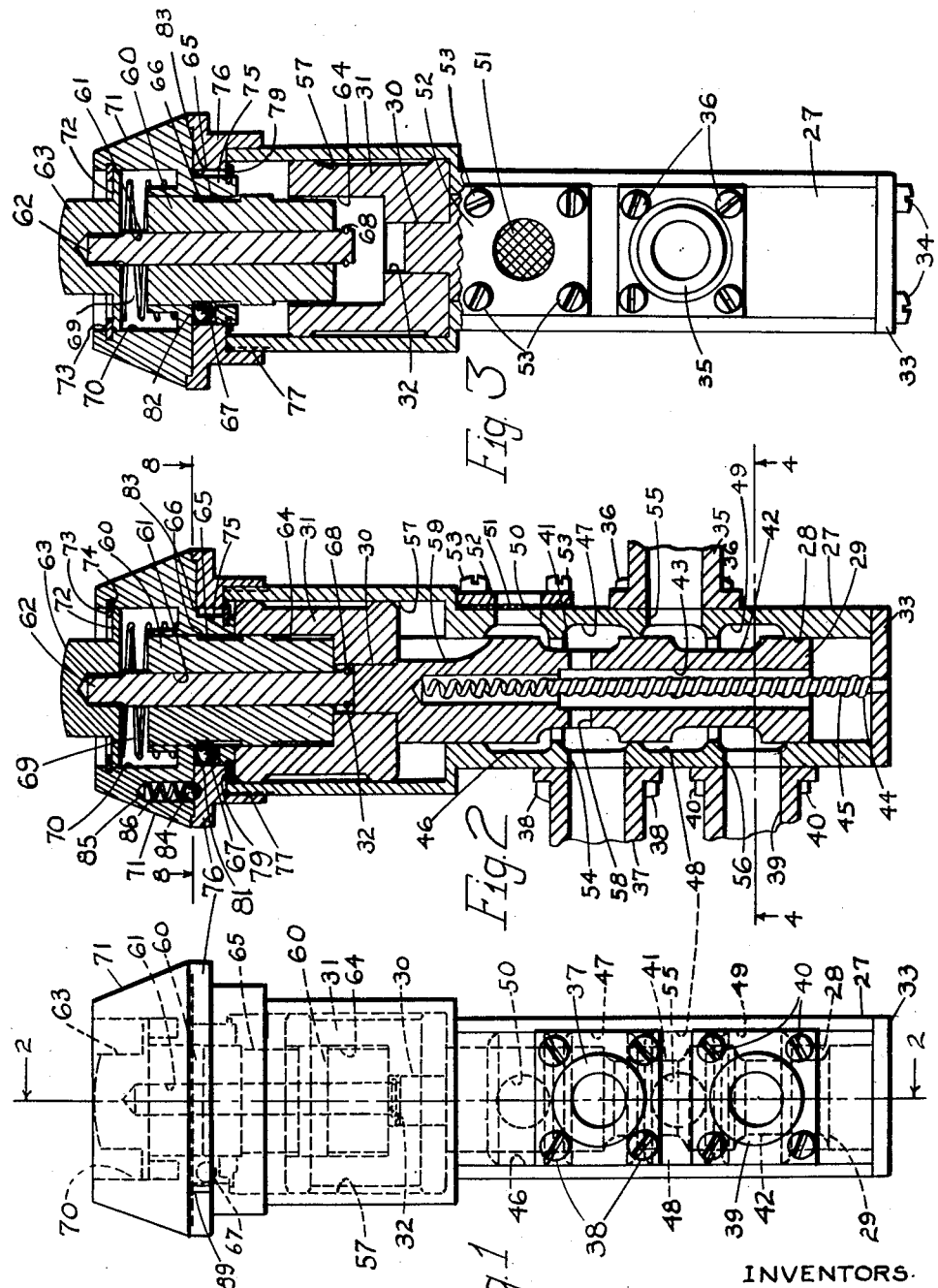

INVENTORS:
DAVID M. CLARK
HENRY W. WILDER
EARL H. WOOD
G. A. HALLENBECK.
BY Chester A Williams
ATTORNEY Patented Nov. 11, 1952

2,617,408

UNITED STATES PATENT OFFICE 2,617,408

VALVE AND SYSTEM FOR THE PROTECTION OF AIRCRAFT OCCUPANTS

David M. Clark and Henry W. Wilder, Worcester, Mass., and Earl H. Wood and George A. Hallenbeck, Rochester, Minn., said Wilder, said Wood, and said Hallenbeck assignors to said Clark.

Application February 26, 1947, Serial No. 731,150

9 Claims. (Cl. 128—1)

This invention relates to a system of protection for airplane occupants against the physiological hazards that manifest themselves in the maneuvering of an airplane (or any similar type vehicle such as a rocket) at high speed, and particularly, for example, when the plane is subjected to intense acceleration forces. More particularly, the present invention relates to an improved valve control device for use in such a protective system. Such a protective system is disclosed in a pending United States patent application of David M. Clark and Henry W. Wilder, filed July 12, 1946, and bearing Serial No. 683,098.

Such acceleration forces are most commonly set up when an aircraft is turned while traveling at a high rate of speed as in this maneuver the aircraft and the occupants thereof are subjected to tremendous centrifugal forces which may cause an occupant to lose vision and/or consciousness.

The purpose of the present system is to overcome all such hazards by providing means instantly responsive to any acceleration such as that caused by a change in direction of a plane's movement for creating, against critical portions of a pilot's or other occupant's body, pressure sufficient to maintain a normal circulation and blood supply to the head and brain. Such a system also contemplates the immediate release of these counterpressures upon the completion of the turn or other circulation disturbing maneuver. It is the primary purpose of our invention to provide in such a protective system a valve means for effecting such counteracting pressures and also for controlling the intensity of said pressures in a manner commensurate with the physiological needs of the plane's pilot or occupants.

Another object of the present invention is to provide such a valve means which is most compact and lightweight to the end that little space is required in the plane for the accommodation thereof and little extra weight is added to the plane by the installation thereof.

With these and other objectives in view, as will hereinafter appear, the invention comprises the devices, combinations and arrangements of parts described in connection with the accompanying drawings which illustrate a preferred embodiment of the invention in which:

Fig. 1 is a side elevation view of the present valve device.

Fig. 2 is a front elevation view taken substantially along the line 2—2 of Fig. 1.

Fig. 3 is a right side view, partly in section, of the device as disclosed in Fig. 2.

Fig. 4 is a sectional view taken substantially along the line 4—4 of Fig. 2.

Fig. 5 is a side elevation view of a portion of the present valve device.

Fig. 6 is a top plan view of that portion of the device disclosed in Fig. 5.

Fig. 7 is a bottom view of the device as disclosed in Fig. 5.

Fig. 8 is a section view taken substantially along line 8—8 of Fig. 2.

Fig. 9 is a longitudinal sectional view taken substantially along the line 9—9 of Fig. 8.

Like reference characters refer to like parts in the different figures.

Figure 11:
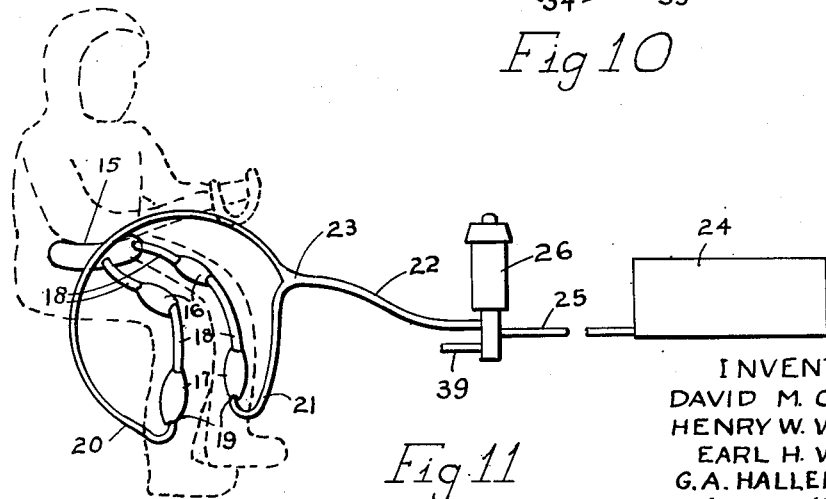
Fig. 11 is a diagram of the several connected elements of a protection system, and showing schematically the positions, on a pilot's body, of certain inflatable elements thereof.

Our invention contemplates the use of compressed air, or other fluid pressure medium, for the creation of counterpressures against critical portions of the pilot's or other plane occupant's body sufficient to produce the increase in blood pressure at the level of the heart necessary to maintain the circulation and blood supply to the brain and head whenever the conditions of a plane flight are such as to cause an increase in weight of the blood and tissues so that the blood tends to flow towards the lower portions of the body and away from the head and brain; for this purpose the pilot or occupants wear a suitable set of inflatable-bladder like elements which are held closely against such areas of the portions of his body as are traversed by or adjacent to the supply vessels of his blood circulatory system. Such inflatable-bladder elements may be incorporated, if desired, in a harness-like assembly worn over or beneath the aviator's clothes, or if desired, they may be sewn or otherwise attached to the inside of his suit. Regardless of how applied or held, a typical arrangement of these bladders, as shown by way of example in Fig. 11, may consist of bladder 15 arranged crosswise from the wearer's lower abdomen, a pair of bladders 16, 16 arranged lengthwise of his upper thighs and a second pair of bladders 17, 17 extending lengthwise of the calves of his legs, the several bladders being so arranged, spaced and held to exert, when inflated, appropriate and effective pressure against the body areas closely associated with the main and large supply vessels of the wearer's blood circulatory system. Thus, the effect of such inflation is to check in greater or less degree the rate of flow of blood through these vessels thus increasing the blood pressure at the heart which is available to maintain circulation to the head and brain. It is the purpose of the present invention to provide in such a system a valve means to effect such inflation, promptly and in a proper degree whenever the action of the plane tends to reduce the blood circulation to the occupant's head and brain and to supply such blood at a normal rate to these vessels. The several bladders 15, 16, and 17 are preferably connected to each other by appropriate flexible pipes or channels 18, 18 and the bladders 17, 17 each have a suitable fitting 19, 19 for connection to a respective one of the pipes 20 and 21 which are joined to a pipe 22 as at 23. Compressed air or other inflatable medium is, as hereinafter described, supplied to the system through the pipe 22. The plane provides any suitable source of inflating medium, as indicated diagrammatically at 24; this preferably is either a small tank of compressed air or a small air pump, driven by the power of the plane. As shown in Fig. 11, the source 24 is connected by a suitable pipe or conduit 25, to a valve device designated generally by the numeral 26 and to which is connected the pipe 22. This valve is the primary object of the present invention and in the above described bladder system its purpose is to control automatically the inflation and deflation of the system of bladders 15, 16, and 17 in response to such actions or motions of the plane as tend to disturb materially the normal circulation of blood through the plane occupant's body.

A preferred form of the present invention, used to control automatically inflation and deflation of the bladders, is illustrated by way of example in Figs. 1 to 9 inclusively. As herein shown, the valve device includes a suitable casing or shell 27 providing a suitable upright bore 28 in which is slidably mounted an elongated piston valve 29. Said valve 29 is provided at its top end thereof with a reduced portion 30 about which is seated a weight 31 by means of an aperture 32 in said weight. The lower end of the casing 27 is provided with an end cap 33 secured to the casing by means of screws 34.

Referring particularly to Fig. 2, the compressed air pipe 25 is adapted to be secured to a conduit 35 which is secured to the casing 27 by means of a plurality of screws 36. The pipe 22 is adapted to be secured to a conduit 37 which is secured to the casing 27 by means of screws 38. An outlet conduit 39 is secured by way of screws 40 to the casing 27 for the purpose of conducting unused air out of the casing 27. Provided about the periphery of the valve 29 are two valve ports in the form of annular recesses 41 and 42. Longitudinally of the valve 27 is provided a bore 43 for the purpose of receiving an expansion spring 44 which extends from the cap 33 upwardly into the bore 43 for the purpose of biasing the valve 29 in an upward direction. Extending upwardly from the cap 33 is a pin or rod 45 the purpose of which is to support the spring 44 within the bore 43. This spring is sufficiently strong to hold the valve 29 and also the weight 31 normally in the elevated position shown in Fig. 2.

Provided in the bore 28 of the casing 27 are a series of ports in the form of annular recesses bearing the numbers 46, 47, 48 and 49. It is to be understood, by reference to Fig. 2, that the port 46 communicates with the outside of the casing 27 by means of an aperture 50 which is covered by a metal screen 51 secured in place over the aperture by means of a plate 52 which is in turn held against the casing 27 by means of screws 53. This screen 51 will prevent any foreign matter from gaining entrance into the casing 27. The port 47 is in communication with the conduit 37 by means of an aperture 54 provided in the casing wall. The air supply conduit 35 is in direct communication with the port 48 by means of an aperture 55 provided in the casing wall and the port 49 communicates directly with the conduit 39 by way of an aperture 56 also formed in the casing wall.

From the above, it may be understood that the present valve, in the condition shown in Fig. 2, is adapted to receive air from the tank 24, which air gains entrance into the casing by way of conduit 35 and then finds its way into the casing port 48 which is in direct communication with the casing port 49 by way of the valve port 42. Thus, the air from the conduit 35 will find its way finally to conduit 39 from which it will be directed out of the casing. Therefore, since the casing port 48 is not in communication with the conduit 37, no air from the supply tank 24 may find its way into the pipe 22 and consequently into the bladder system. While in this normal condition, the bladder system is entirely deflated as the bladders are in communication with the atmosphere outside of the casing 27 by way of the casing port 47, valve port 41 and vent opening 50. Thus, the bladders are in direct communication with the outside atmosphere whenever the valve 29 is in the position shown in Fig. 2, and furthermore, any air from the tank 24 which gains entrance into the casing 27 is directed, not through the bladders but through the conduit 39, thereby to be spilled out into the atmosphere.

Referring particularly to Fig. 2, it is to be understood that the weight 31 is slidingly received within an enlarged cylindrical portion 57 of the casing 27, and therefore, whenever the plane is subjected to acceleration forces which would result in a downward thrust upon the weight 31 and valve 29, these two elements will, if the acceleration forces are sufficiently strong, move downwardly against the action of the spring 44. The downward movement of the valve 29 and weight 31 is arrested when the lower portion of the valve engages the end cap 33 of the casing. With the valve in this lower position which is indicated in Fig. 1, it is to be understood that the valve port 41 will have been shifted downwardly thereby to place the casing port 47 in direct communication with the conduit 35. The air from the tank 24 will then gain entrance into the conduit 37 thereby to be effective to inflate the bladders 15, 16, and 17 by way of the pipe 22. With the valve 29 in this lower position, it is to be understood that the valve port 42 will no longer be in communication with the casing port 48 and thus the air from the tank 24 can no longer spill out of the casing 27 by means of the conduit 39. Also, the valve port 41 will no longer be in communication with the aperture 50 by way of the casing port 46 and, therefore, the bladders can not be deflated through the aperture or vent 50.

With the valve 29 in this lower position, the tank 24 will inflate the bladder system completely and tend to build up the pressure within these bladders to a pressure equal to that existing in the tank 24. However, the present invention contemplates that the pressure within the bladder system will only reach that intensity which is commensurate with the needs of the pilot. It is to be understood that the pilot's physiological needs will be at any one time dependent upon the particular acceleration forces to which he is subjected. Therefore, the pressure within the bladder system should be proportioned to the intensity of the acceleration forces existing at any particular time. To accomplish this object the present valve 29 is provided with a radial bore 58 which communicates directly at all times with the axial bore 43 and thus, when the valve 29 is in its lowest position, the air from the tank may gain entrance into the bore 58 by way of the valve port 41 and find its way downwardly through the bore 43 and into the lower portion of the casing 27. It is to be understood that the air which finds its way into the lower portion of the casing 27 will produce an upward thrust against the valve 29 and thereby tend to act in conjunction with the spring 44, and if these combined upward forces are great enough, they will tend to overpower the acceleration forces which are acting in the reverse direction. By so proportioning the strength of the spring 44 and the mass of the weight 31, the present valve mechanism may be effective to regulate the pressure existing within the bladder system in a ratio proportional to the applied acceleration forces. It is to be understood, that when the valve 29 is forced upwardly by the air, against the action of the acceleration forces, the valve will be effective to divert a portion of, or all of the air, from the tank 24 away from the bladder system thereby to maintain within the bladder system a pressure which is proportional to the intensity of the applied acceleration forces. Thus, by moving up and down under the forces set up by the plane's acceleration and the air pressure within the tank 24, the valve 29 may be effective to supply air to the bladder system in a manner to meet the physiological requirements of the pilot.

Referring again to Fig. 2, the upper portion of the valve 29 is provided with a slot 59 for the purpose of venting the cylindrical portion 57 to the atmosphere at all times by way of the vent aperture 50. Thus, the interior of the chamber 57 is at all times subjected to the normal pressure which exists outside of the casing 27.

As thus described, the valve device is provided with the weight 31 which has a pre-determined mass and therefore, the valve will be actuated in response to a substantially fixed predetermined intensity of acceleration force. As long as the mass of the weight 31 and the strength of the spring 44 do not vary, the valve will always be responsive to the same definite intensity of acceleration force.

There are times however when the pilot wishes to have the system produce within the bladders a higher pressure per unit of acceleration force than is normally produced therein. For example, whenever a pilot executes a 180 degree turn more time is required for its completion than would be required for a turn of lesser degree, assuming that the plane is flying at the same rate of speed in both cases. Therefore, the greater the turn the longer will be the duration in which the pilot is subjected to the deleterious acceleration forces. Even though the intensity of acceleration force may be the same in both the above noted turns it has been found to be helpful to have a higher bladder pressure produced whenever the turn is of long duration.

To accomplish this purpose the present device is provided with a cylindrical auxiliary weight 60 provided with an axial aperture 61 which slidingly receives a rod 62 the top portion of which is threaded into a thumb button 63. The lower portion of the auxiliary weight 60 is adapted to be loosely received within a cylindrical aperture 64 provided in the top portion of the weight 31. Provided about the auxiliary weight 60 is an annular recess 65 having a shoulder portion 66 which normally is engaged by a plurality of balls 67 for the purpose of retaining the auxiliary weight 60 in its upper or ineffective position. As long as the weight 60 is retained in this upper position, as illustrated in Fig. 2, it can not move downwardly in response to the acceleration forces and therefore has no effect upon the operativeness of the hereinabove described valve.

The rod 62 is provided at its lower portion with an encircling ring 68 which is effective to prevent the auxiliary weight from sliding past the lower end of the rod 62. A secondary spring 69 is positioned within a circular recess 70 provided in a cap 71 and this secondary spring at its top portion bears against a circular flange 72 provided on the button 63 thereby to bias the button 63, and consequently the weight 60, upwardly. A split retaining ring 73 (see Figs. 2 and 6) seated in a groove 74 provided about the recess 70 retains this button 63 within the recess 70. Thus, it is to be understood that if the balls 67 were to be removed from the weight recess 65, the secondary weight would be free to move downwardly with the weight 31 if the acceleration forces were great enough to overcome the upward biasing forces of the springs 44 and 69.

It is the purpose of the thumb button 63 to provide a means whereby the valve 29 may be thrust downwardly at any time to the end that the pilot may, at will, inflate the bladder system for the purpose of testing the system or for controlling the system manually. It is to be understood that whenever the button 63 is manually depressed the pin 62 will move downwardly through the normally stationary secondary weight 60 thereby to bear against the top of the valve 29 and to shift the valve downwardly.

Referring particularly to Figs. 2, 5, 6 and 7, the cap 71 is formed at its bottom with an annular flange 75 which extends into a collar member 76 threaded, as at 77, upon the upper portion of the casing 27. About the flange 75 is provided a circular groove 78 for receiving a split ring 79 which bears against a shoulder 80 (see Fig. 9) of the collar 76 thereby to lock the cap 71 to the collar so that the cap may turn relative to the collar.

Provided within the cap flange 75 are three radially disposed apertures 81 (see Figs. 2, 8 and 9) in which the balls 67 are mounted. In the position illustrated in Figs. 2 and 8 of the drawings, the balls 67 engage the secondary weight 60 as the circular wall portions 82 of the collar bear against the balls and force them inwardly. However, formed between the wall portions 82 are circular recesses 83 which, when the cap 71 is rotated, may be brought into register with the balls 67. Whenever the balls 67 are thus in register with the recesses 83 (see Fig. 1) they no longer are biased against the weight 60 and, therefore, the weight may, as hereinabove described, be moved downwardly in response to acceleration forces.

To facilitate the indexing of the cap 71 it is provided with three detent balls 84 which are disposed within bores 85 provided in the cap 71. Springs 86, located within the bores 85, urge the detent balls downwardly against the top face of the collar 76 which is provided with six hemispherical detents 87. It is to be understood that these detents 87 are so spaced that three of them will receive the balls 84 thereby to position the cap recesses 83 in register with the balls 67, and the other three detents will, upon rotation of the cap, receive the balls 84 thereby to position the circular wall portions 82 of the cap in register with the balls 67. Therefore, by merely turning the cap 71, the weight 60 may be rendered operative or inoperative at the will of the pilot. To facilitate this indexing of the cap it is provided with a series of finger grooves 88 about the periphery thereof. Also, the indicia letters "Hi" and "Lo" are inscribed about the cap periphery (see Figs. 1 and 6) and a vertical line 89 is inscribed in the collar periphery for the purpose of showing the pilot the position of the cap setting.

This secondary spring 69 is designed to bias the secondary weight 60 upwardly and the mass of this weight and the strength of this spring are so selected that this weight will move downwardly (when the balls 67 are removed therefrom) in response to the same intensity of acceleration force which is effective to move the weight 31 downwardly against the action of its spring 44. Therefore, by rendering the secondary weight operative, the valve mechanism will be responsive initially to the same intensity of acceleration force as when the weight 60 was inoperative. However, when the weight 60 is rendered operative and has moved downwardly along with weight 31 in response to a given acceleration force, it is to be understood that it will require a greater air pressure within the lower portion of the casing 27 to raise the both weights against the downward acceleration thrust than would be required if only the weight 31 was operative. Therefore, the air pressure within the bladders will increase until the pressure is great enough to lift the both weights 31 and 60. From this it is to be understood that whenever the weight 60 is rendered operative, the ratio between the acceleration force intensity and air pressure intensity within the bladders is altered. In other words, if the pilot wishes to have the bladders exert against his body a greater intensity of pressure per unit of applied acceleration force, he need only turn the cap 71 thereby to render the weight 60 operative. This action, however, will not vary the intensity of acceleration force required to initially shift the valve downwardly for, as hereinabove noted, the same acceleration force is required to shift the valve downwardly in the case where the two weights are employed as in the case where only one weight is employed.

Figure 10:
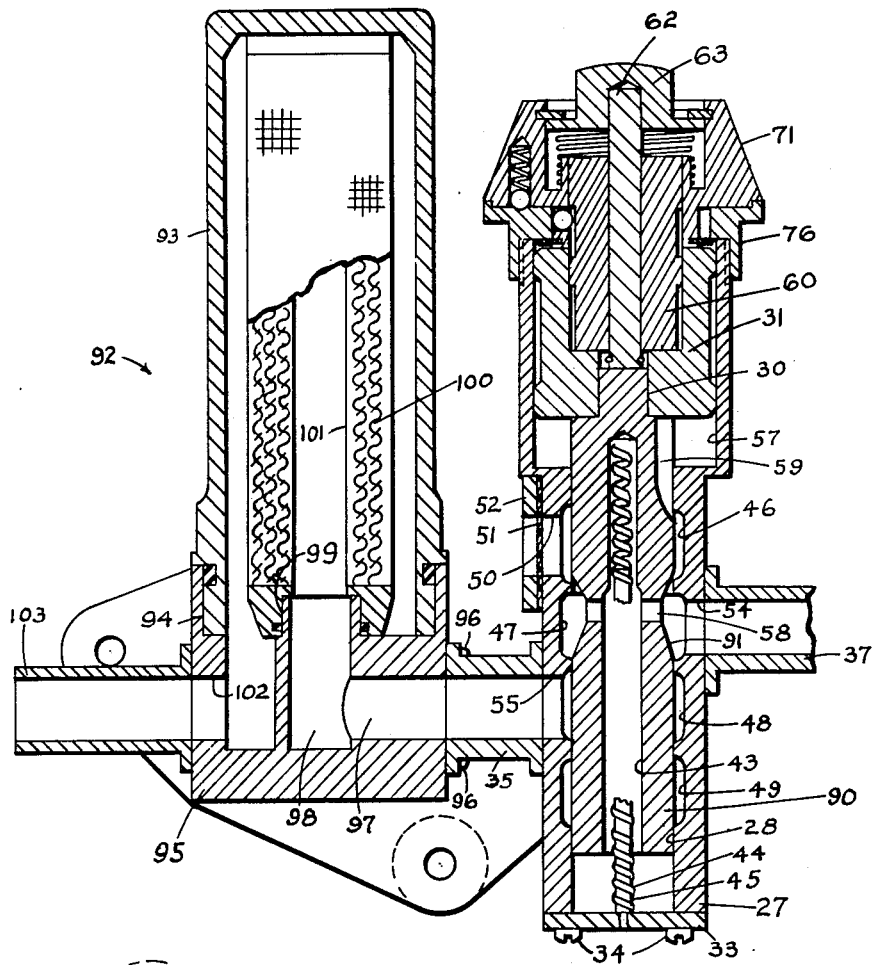
Fig. 10 is a side elevation, in section, of a modified form of the present invention.

Illustrated in Fig. 10 is a second form of the present device which is adapted to be used whenever the air supply system is such that it does not require the unused air to be spilled out of the casing 27. More specifically, the present modified unit comprises the same valve unit as hereinabove described with the exception that in the modified form a different valve is used and, further, the outlet port 56 and its accompanying conduit 39 have been omitted.

In lieu of the valve 29 of the former mechanism the present unit is provided with a valve 90 which differs from valve 29 only in that the present valve is supplied with a single recess port 91 rather than with two ports as provided on valve 29. In the present unit, air under pressure is supplied to the casing through conduit 35 and casing aperture 55, and whenever the valve 90 is in its highest position this air can go no further than the casing port 48 and is not spilled overboard as in the case of the former unit. However, whenever the valve 90 moves downwardly in response to an acceleration force, the conduit 37 is placed in communication with casing port 48 by means of the valve port 91 to the end that the bladders are inflated. It is to be understood that the modified valve unit in all other respects functions in a manner similar to that of the first form of the invention and further explanation will not be necessary.

Connected to the inlet conduit 35 is an air filter unit generally designated by the numeral 92. This filter unit functions to prevent foreign matter from entering the valve casing. More specifically, the filter unit comprises a cylindrical housing 93 threaded, as at 94, into a manifold member 95 which is connected to the conduit 35 by means of screws 96. Formed within the manifold member 95 is a bore 97 leading from conduit 35 to a vertically disposed bore 98 over the top portion of which is disposed, as at 99, a cylindrically shaped wire (or other suitable material) filter-sleeve 100 having a hollow aperture 101 formed therein. Also formed in the manifold member 95 is a bore 102 which is connected by means of a conduit 103 to an air supply source. It is to be understood, therefore, that the air entering the manifold from a supply source is first screened through the filter screen 100 before it can find its way into the valve casing 27.

Thus, this modified unit may be advantageously employed whenever the hereinabove described system is to be used in conjunction with an air supply system which may, with impunity, be blocked off. Furthermore, this modified unit is well adapted to employ an air supply system which provides unfiltered air.

We claim:

1. In a valve mechanism which is adapted to be subjected to acceleration forces, a casing adapted to be connected to a source of fluid under pressure and to a fluid-receiving means, a control element mounted for movement within said casing in one direction in response to acceleration forces thereby to connect said fluid source with said fluid-receiving means, means automatically to move said control element in the opposite direction upon the cessation of said acceleration forces thereby to disconnect said fluid source from said fluid-receiving means, and means within said casing for directing a portion of said fluid against said control element so as to bias the same in said opposite direction thereby to vary the pressure of the fluid supplied to said fluid-receiving means in a ratio proportional to the intensity of said acceleration forces.

2. In a valve mechanism which is adapted to be subjected to acceleration forces, a hollow casing adapted to be connected to a source of fluid under pressure and to a fluid-receiving means, an outlet vent connecting the hollow portion of said casing with the outside of said casing, a control element mounted for movement within said casing and being movable in one direction in response to acceleration forces thereby to connect said fluid source with said fluid-receiving means, means automatically to move said control element in the opposite direction upon the cessation of said acceleration forces thereby to disconnect said fluid source from said fluid-receiving means and to connect said fluid-receiving means with said outlet vent, means within said casing for directing a portion of said fluid against said control element so as to bias the same in said opposite direction thereby to vary the pressure of said fluid supplied to said fluid-receiving means in a ratio proportional to the intensity of said acceleration forces, and manually controlled means adapted to adjust said valve mechanism thereby to vary said ratio.

3. In a valve mechanism which is adapted to be subjected to acceleration forces, a hollow casing adapted to be connected to a source of fluid under pressure and to a fluid-receiving means, an outlet vent connecting the hollow portion of said casing with the outside of said casing, a control element mounted for movement within said casing and being movable in one direction in response to acceleration forces thereby to connect said fluid source with said fluid-receiving means, means automatically to move said control element in the opposite direction upon the cessation of said acceleration forces thereby to disconnect said fluid source from said fluid-receiving means and to connect said fluid-receiving means with said outlet vent, means within said casing for directing a portion of said fluid against said control element so as to bias the same in said opposite direction thereby to vary the fluid pressure supplied to said fluid-receiving means in a ratio proportional to the intensity of said acceleration forces, manually controlled means for varying said ratio in a predetermined manner, and manually controlled means for connecting said source of fluid pressure with said fluid-receiving means at will.

4. In a valve mechanism which is adapted to be subjected to acceleration forces, a casing adapted to be connected to a source of fluid under pressure and to a fluid-receiving means, a control element and an auxiliary element each mounted within said casing and each being movable in one direction in response to the same predetermined intensity of acceleration force thereby to connect said fluid source with said fluid-receiving means, separate means automatically to move said control element and said auxiliary element in the opposite direction upon the cessation of said acceleration forces thereby to disconnect said fluid source from said fluid-receiving means, means within said casing for directing a portion of said fluid against said control element so as to bias the same along with said auxiliary element in said opposite direction thereby to vary the pressure of the fluid within said fluid-receiving means in a ratio proportional to the intensity of said acceleration force, and manually operable means for rendering said auxiliary element inoperative thereby to vary said ratio.

5. In a valve mechanism which is adapted to be subjected to acceleration forces, a casing adapted to be connected to a source of fluid under pressure and to a fluid-receiving means, a control element and an auxiliary element each mounted within said casing and each being movable in one direction in response to the same predetermined intensity of acceleration force, the said movement of said control element being effective to connect said fluid source with said fluid-receiving means, a pair of independent springs each being adapted to move automatically said control element and said auxiliary element respectively in the opposite direction upon the cessation of said acceleration forces, said latter movement of said control element being effective to disconnect said fluid source from said fluid-receiving means, means within said casing for directing a portion of said fluid against said control element so as to bias the same along with said auxiliary element in said opposite direction thereby to vary the pressure of the fluid within said fluid-receiving means in a ratio proportional to the intensity of said acceleration forces, and manually operable means for rendering said auxiliary element inoperative thereby to vary said ratio.

6. In a valve mechanism which is adapted to be subjected to acceleration forces, a casing having an inlet port and air outlet port, said inlet and outlet ports being adapted to be connected respectively to a source of fluid under pressure and to a fluid-receiving means, a control element slidably mounted within said casing, spring means to bias said control element in one direction thereby to prevent any communication between said inlet and outlet ports, said control element being movable in the opposite direction against the action of said spring in response to a predetermined intensity of acceleration force thereby to place said inlet and outlet ports in communication with each other, means within said casing for directing a portion of said fluid against said control element so as to bias the same in a direction opposed to the applied acceleration force thereby to vary the pressure within said fluid-receiving means in a ratio proportional to the intensity of said acceleration force, an auxiliary element slidably mounted within said casing and axially of said control element, spring means for biasing said auxiliary element in the same direction that said control element is biased, said auxiliary element being movable in the opposite direction against the action of its spring in response to said predetermined intensity of acceleration force thereby to bear against said control element, and manually operable means for rendering said auxiliary element inoperative thereby to vary said ratio.

7. In a system for preventing an unnatural blood distribution within a human body which is subjected to forces set up when said body is accelerated in space, means adapted normally to engage loosely a portion of the human body and adapted when actuated, to effect a pressure against the blood-carrying vessels of said body, a source of air under pressure for actuating said means, a control device automatically operative in response to acceleration forces to cause said source of air to be connected with said means thereby to actuate said means and automatically operative upon the diminution of said acceleration forces to disconnect said means from said source of air, means for directing a portion of the air from said source of air through said control device so as to modify the effect of the acceleration forces thereon thereby to vary the intensity of the pressure exerted upon said means in a ratio proportional to the magnitude of the acceleration forces, and manually controlled means adapted to adjust said last mentioned means thereby to vary said ratio.

8. In a system for preventing an unnatural blood distribution within a human body which is subjected to forces set up when said body is accelerated in space, said system including means adapted normally to engage loosely a portion of the human body and adapted, when actuated, to effect a pressure against the blood-carrying vessels of said body, and a source of air under pressure for actuating said means; the improvement which consists in the provision of a device for controlling said source of air automatically, said device comprising a control element mounted for rectilinear movement and being movable in one direction in response to acceleration forces thereby to connect said first mentioned means with said source of air, means automatically to move said control element in the opposite direction upon the cessation of said acceleration forces thereby to disconnect said first mentioned means from said source of air, and means for directing a portion of the air from said source of air through said control device so as to modify the effect of the acceleration forces upon said control element thereby to vary the intensity of the air pressure upon said first mentioned means in a ratio proportional to the magnitude of the acceleration forces.

9. In a system for preventing an unnatural blood distribution within a human body which is subjected to forces set up when said body is accelerated in space, said system including means adapted normally to engage loosely a portion of the human body and adapted, when actuated, to effect a pressure against the blood-carrying vessels of said body, and a source of air under pressure for actuating said means; the improvement which consists in the provision of a device for controlling said source of air automatically, said device comprising a control element mounted for rectilinear movement and being movable in one direction in response to acceleration forces thereby to connect said first mentioned means with said source of air, means automatically to move said control element in the opposite direction upon the cessation of said acceleration forces thereby to disconnect said first mentioned means from said source of air, means for directing a portion of the air from said source of air through said control device so as to modify the effect of the acceleration forces upon said control element thereby to vary the intensity of the air pressure upon said first mentioned means in a ratio proportional to the magnitude of the acceleration forces, and manually controlled means to adjust said control element thereby to vary said ratio in a predetermined manner.

DAVID M. CLARK.
HENRY W. WILDER.
EARL H. WOOD.
GEORGE A. HALLENBECK.

REFERENCES CITED

The following references are of record in the file of this patent:

UNITED STATES PATENTS

| Number | Name | Date |
|---|---|---|
| 2,104,758 | Poppen | Jan. 11, 1938 |
| 2,222,886 | Voigt | Nov. 26, 1940 |
| 2,293,889 | Florez | Aug. 25, 1942 |
| 2,335,474 | Beal | Nov. 30, 1943 |
| 2,475,479 | Clark | July 5, 1949 |